April 28, 1953
H. C. RHODES
2,636,470
DOUGH GREASING DEVICE
Filed May 10, 1950
3 Sheets-Sheet 1
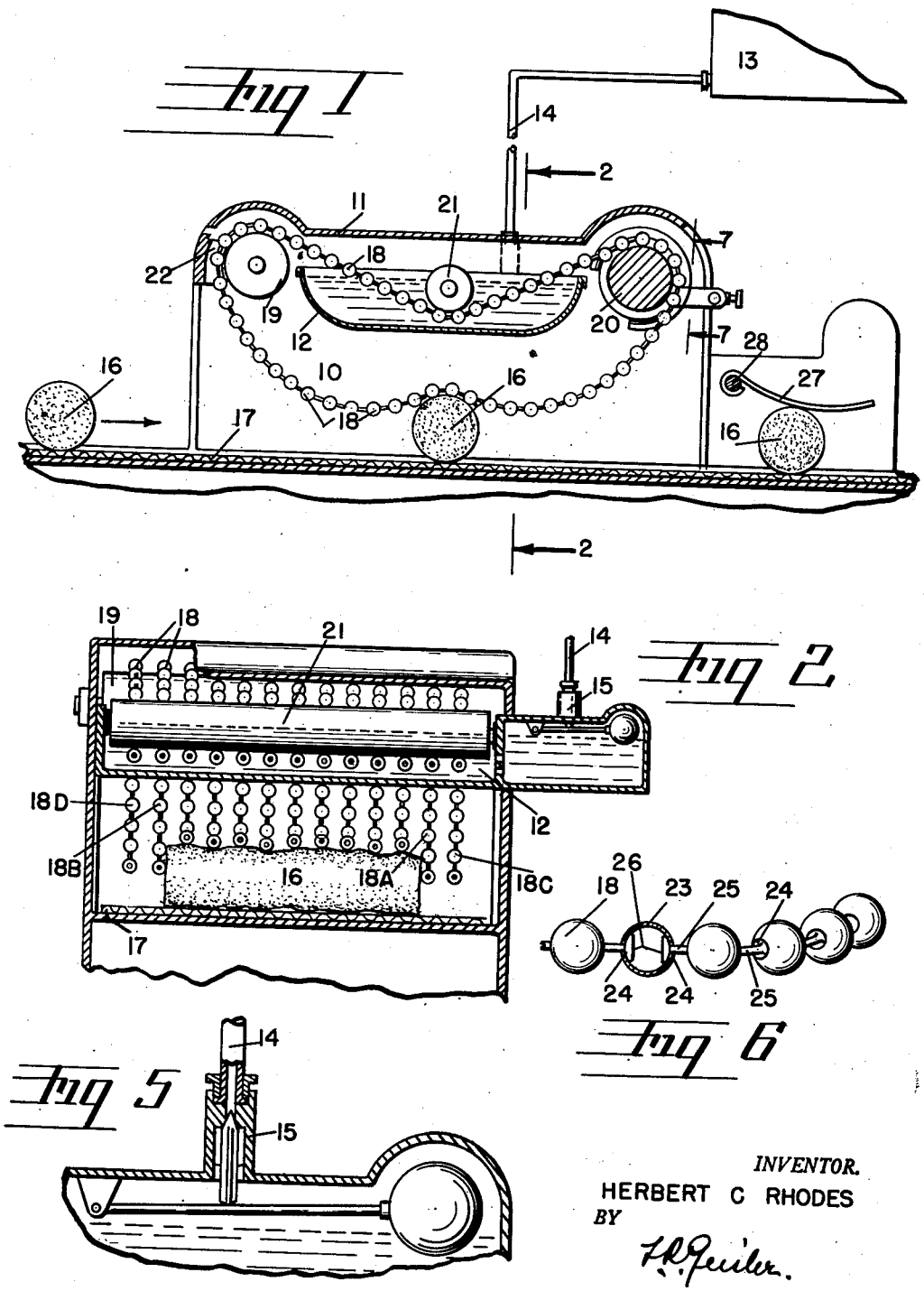
INVENTOR.
HERBERT C RHODES
BY
F. R. Geisler
ATTORNEY

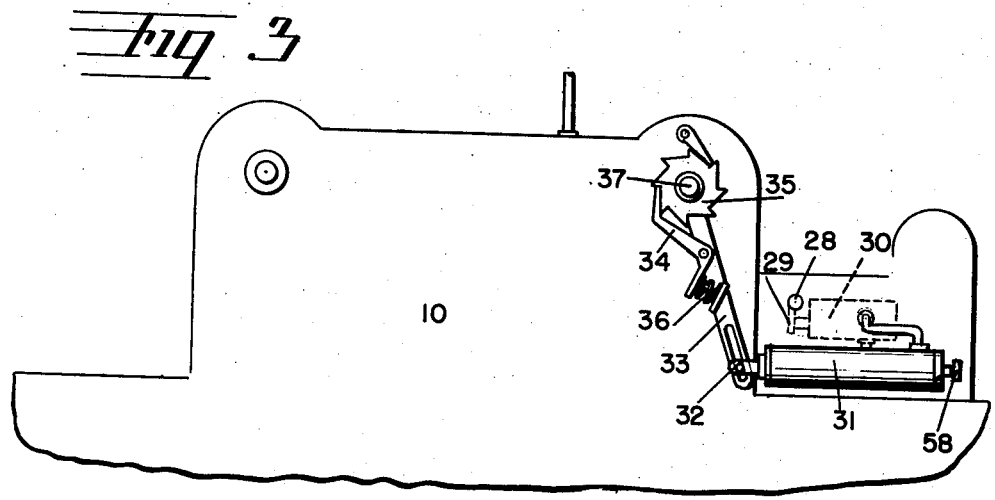
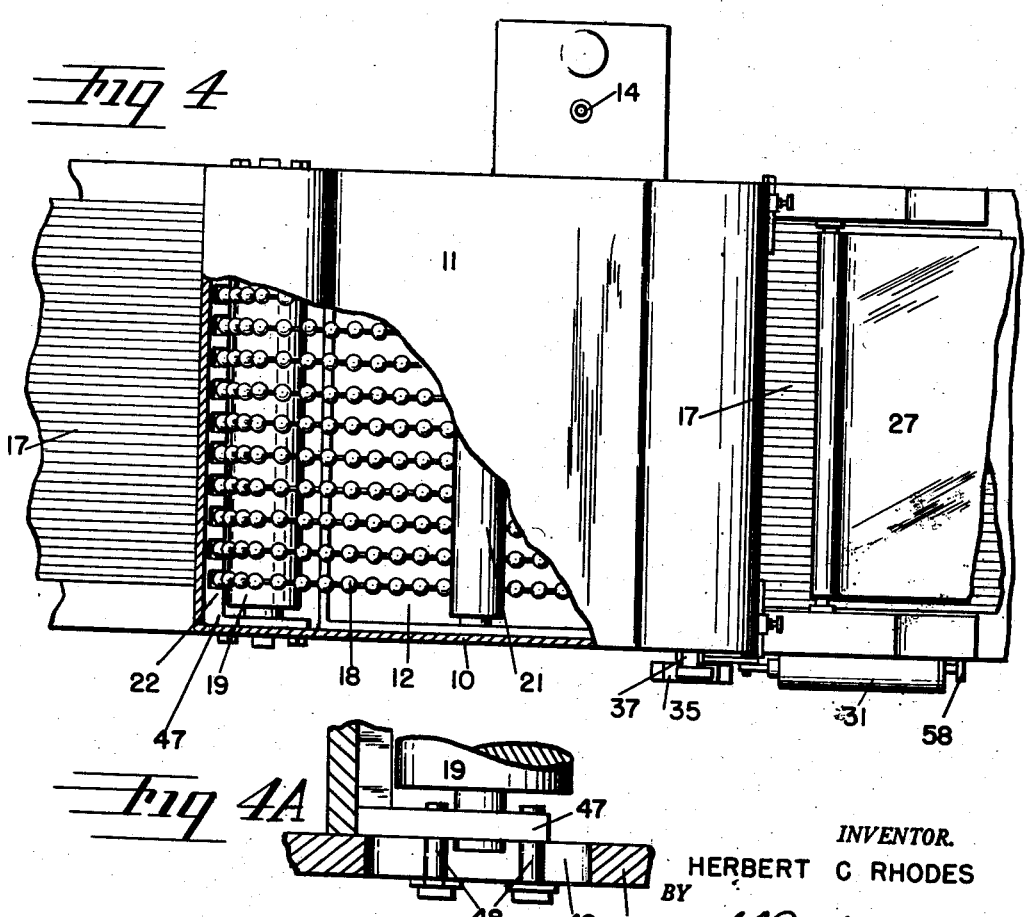

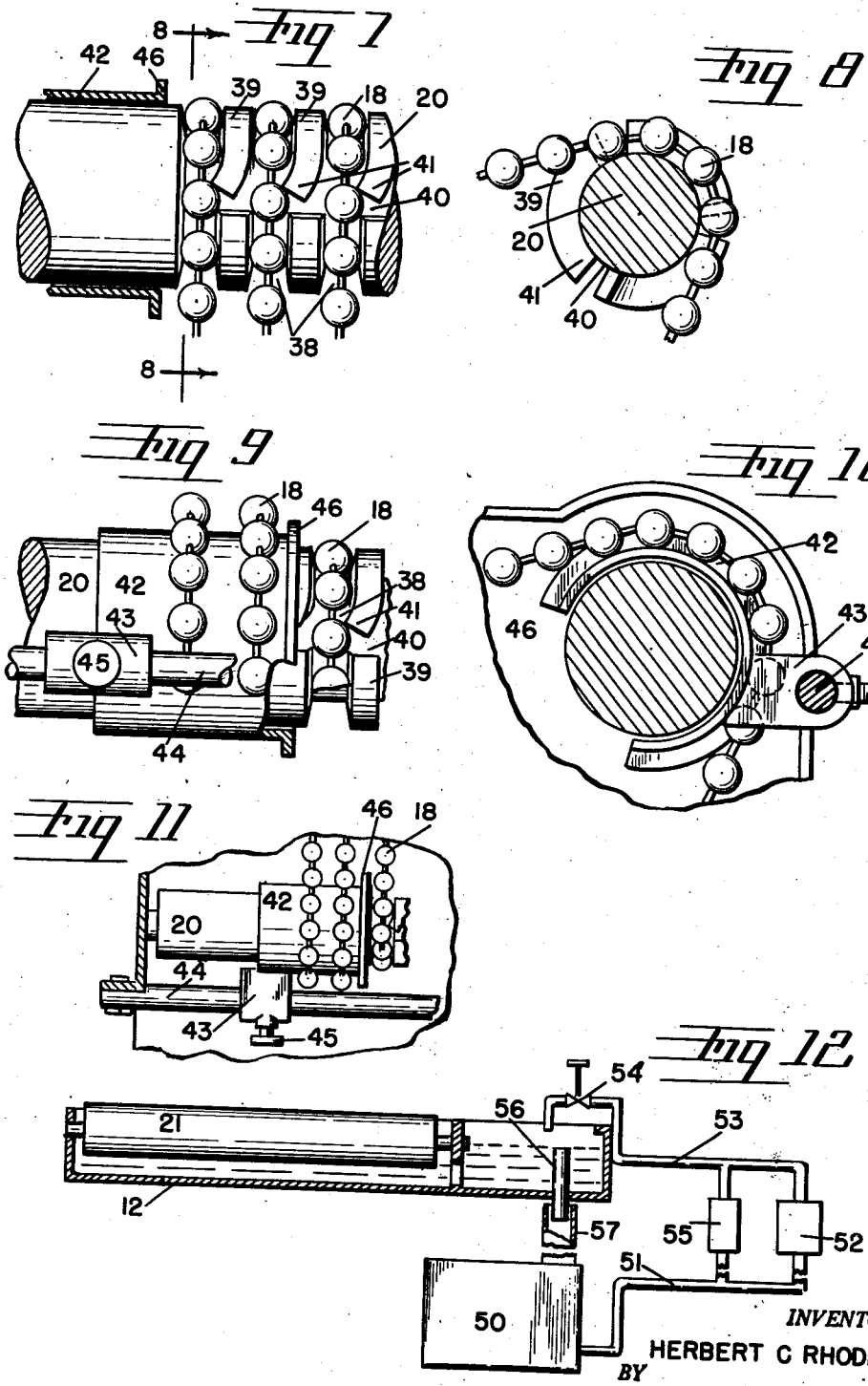

Patented Apr. 28, 1953

2,636,470

UNITED STATES PATENT OFFICE 2,636,470

DOUGH GREASING DEVICE

Herbert C. Rhodes, Portland, Oreg., assignor to Read Standard Corporation, a corporation of Delaware Application May 10, 1950, Serial No. 161,142

9 Claims. (Cl. 118—16)

This invention relates in general to the application of a thin coating of grease or oil to the outside surface of a molded piece of dough previous to the depositing of the dough in a baking pan. As is well known, the main purpose of applying the grease or oil to the surface of the dough is to prevent the dough from sticking to the baking pan and thus to enable the resulting loaf of bread or other product to be easily removed from the pan after the completion of the baking. The proper greasing of the dough eliminates the necessity for greasing the pan.

Various means have been tried, where the preparation and baking of dough products is done on such large scale that it is not practical for the greasing of the dough to be done manually, for applying this desired coating of grease or oil to the molded dough pieces mechanically on their way to the baking pans. Thus attempts have been made to apply oil to pieces of dough by means of sprays, and also to have the dough contact endless traveling belts of canvas and the like which are mechanically coated with oil or melted grease. These means, however, have not proven satisfactory due to the fact that they do not cause the oil or grease to be evenly distributed over the entire surface of the dough or else cause the oil or grease to be distributed in such heavy amounts that the resulting crust produced by the baking is too greasy.

Another object of the present invention is to provide improved means for applying oil or melted grease to the surfaces of the pieces of dough, which means will avoid the above mentioned difficulties.

A further object of the invention is to provide improved and novel dough greasing means which will be simple in construction, in operation, and in maintenance.

These objects and other related advantages I have been able to obtain by employing, as part of my dough greasing means, a plurality of separate but cooperating endless chain grease conveyors of novel form and arrangement, operating in the manner hereinafter briefly described with reference to the accompanying drawings.

In the drawings:

Fig. 1 is a fragmentary sectional side elevation of my improved dough greasing means;

Fig. 2 is a transverse section on line 2—2 of Fig. 1;

Fig. 3 is a side elevation corresponding to the sectional side elevation of Fig. 1;

Fig. 4 is a top plan view with a portion of the top broken away;

Fig. 4A is an enlarged fragmentary sectional plan of the mounting of one end of a roller shown in Fig. 4;

Fig. 5 is a fragmentary enlarged section of the float control for the oil reservoir shown in Fig. 2;

Fig. 6 is an enlarged view, partly in perspective and partly in section, of a portion of one of the endless chains which act to convey the oil or melted grease to the dough;

Fig. 7 is an enlarged fragmentary view of the chain-moving roller, the view being taken on line 7—7 of Fig. 1;

Fig. 8 is a transverse section of the roller taken on line 8—8 of Fig. 7;

Fig. 9 is a fragmentary view of the chain moving roller similar to Fig. 7, but showing a chain resting support acting to hold two of the chains lifted out of contact with the chain-moving roller;

Fig. 10 is a section on line 10—10 of Fig. 9;

Fig. 11 is a fragmentary top plan view of the chain resting support of Fig. 9 and corresponding end of the roller, but drawn to a smaller scale; and Fig. 12 is a fragmentary and more or less diagrammatic sectional elevation, corresponding in part to Fig. 2, and illustrating a pumping system for supplying light oil to the dough greaser in place of the oil-supplying means illustrated in Figs. 1, 2 and 5.

My dough greasing means is mounted in a housing consisting of a pair of side walls 10 located on opposite sides of the dough conveyor and a top cover portion 11. A pan for oil (or melted grease) 12 is supported in the housing at a spaced distance above the dough conveyor so that the pieces of dough will have ample space to pass underneath the pan 12. Preferably oil is used for the greasing of the dough, although warm liquid grease may be used if desired, and the oil or grease in the pan 12 may be kept at any suitable desired temperature by thermostatically controlled electric heating means (not shown).

The oil or liquid grease is supplied to the pan 12 from a tank, indicated in part at 13 in Fig. 1, having an outlet pipe 14. A float valve 15 (Figs. 2 and 5) controls the discharge of the oil from the tank 13 and acts to maintain the same at a constant level in the pan 12, as will be evident from Fig. 2.

The molded pieces of dough, which are to be coated with the oil (or grease) prior to being deposited in the baking pans, are indicated by the reference character 16 in Figs. 1 and 2.

These pieces of dough are moved along through the dough greasing means and to the baking pans on an endless traveling belt 17 (see also Fig. 4).

A plurality of identical endless chains 18, of the same length, arranged close together but separated from each other by equally-spaced intervals at least during part of their travel, pass over a pair of supporting rollers 19 and 20 (Fig. 1) located beyond opposite ends of the pan 12, and under a third roller 21 mounted within the pan 12. The roller 20 is rotated, by means to be described later, and the rotation of this roller causes the chains to move slowly through the pan of oil 12, and, as the chains leave the pan 12, they carry a certain amount of oil from the pan which will cling to them. These chains 18, as shown in Fig. 1, are long enough so that the lower portions of the chains will come into engagement with the pieces of dough 16 as the pieces of dough are moved along beneath the pan 12 on the belt 17, and, when coming into contact with the dough pieces, will freely conform to part of the contour of the dough.

Obviously there will be irregularities in the shape and contour of the dough pieces, but the separate flexible chains will accommodate themselves to the same, whereas a broad flat belt, when employed as the means for applying oil to the dough may hit only the so-called high places. This has been one of the main reasons why the application of oil to the dough by means of belts of canvas and the like, acting as conveyors of the oil, has proven unsatisfactory.

As each piece of dough, moving from left to right as viewed in Fig. 1, encounters the oil covered chains 18, which are moving slowly in an opposite direction, the piece of dough will be rotated counterclockwise by the chains (as viewed in Fig. 1) with the result that the entire more or less cylindrical surface of the piece of dough will be brought into contact with the oil-carrying chains 18 before the piece of dough passes beyond the dough greasing means. As the chains 18 are drawn upwardly and over the roller 19, they pass through a notched guide 22 (shown most clearly in Fig. 4) which is provided with notches spaced short, equal distances apart, one chain passing through each notch. In this way the chains are kept spaced at a slight distance from each other as they pass into and through the oil pan 12, with the result that each chain receives a coating of oil in the pan 12 without interference from, or contact with, any other or adjacent chain. While the chains are free to contact each other as they come into engagement with the pieces of dough 16, the fact that they are all of identical length and follow parallel paths prior to moving downwardly from the roller 20, prevents them from riding over each other or failing to continue to be spread substantially over a sufficiently wide area to cover the dough surface as the dough is moved along by the belt in one direction while the chains are moving in the opposite direction.

The chains 18 are not drawn to scale in Figs. 1, 2, and 4 but have been drawn larger by comparison for the sake of clarity. These chains consist of hollow metal spheres connected by short link bars. The chains are similar both in size and construction to the familiar chains used in pull-sockets for electric light fixtures and for other purposes. Their construction is shown clearly in Fig. 6. The hollow metal spheres 23 are preferably of from $\frac{1}{16}$ of an inch to $\frac{3}{8}$ of an inch in outside diameter. Each sphere 23 has a pair of diametrically opposite holes 24 of larger diameter than the main diameter of the wire link bars 25 which connect the spheres. Each end portion 26 of each link bar 25 within a sphere is enlarged or spread until its diameter considerably exceeds the diameter of the holes 24 in the sphere through which the bars 25 extend, and these enlarged ends 26 prevent the link bars from being pulled loose from the spheres. The link bars 25 are of such length that the spheres can not be spaced more than about $\frac{1}{8}$ inch apart. Chains of this general type are so well known for other uses that further description is unnecessary.

As the chains pass through the pan 12 the spheres 23 and link bars 25 become coated with oil. Some of the oil also enters partway into the openings 24 in the spheres. As the chains then leave the pan 12 and pass around the driven roller 20 and then down into contact with the dough pieces 16 a considerable oil coating will cling to each chain, thus to each sphere and link bar, and especially will collect on the link bars in the spaces between the spheres. Capillary attraction is largely responsible for this tendency of the oil to cling to the spheres and link bars. However, as the chains contact the dough pieces 16, a considerable portion of the oil clinging to the chains is gradually given off. This results in oil being applied to the dough pieces in the nature of small deposits close together, instead of excessive amounts in more widely separated areas which so often happens when previously tried mechanical means for greasing dough have been used. These small deposits of oil close together then spread until they merge and form a thin film on the dough surface. The spreading of these small deposits of oil into a thin film on the dough surface is due in part to the engagement of the chains with the dough surface and in part to the fact that the dough pieces are also rolled on the belt as the result of their engagements with the chains. The combined action causes the desired even spreading and distributing of the oil over the dough surface. The fact that the individual spheres and link bars in each chain have some relative movement with respect to each other when encountering the dough pieces also aids in the depositing of the oil from the chains in small amounts on the dough pieces.

The viscosity of the oil in the pan 12 and the speed with which the chains 18 are moved will have some influence on the resulting oil film coating on the dough surface. By having the oil in the pan maintained at fairly uniform viscosity and temperature and by keeping the movement of the chains at proper regulated speed, uniform results will be assured as the individual pieces of dough, of uniform size, pass at predetermined speed and at uniform intervals through my dough greasing means.

The chain-moving roller 20 is formed with spaced annular grooves 38 (Figs. 7, 8 and 9) for most of its length, there being one groove for each chain 18, with the width of the grooves 38 corresponding to the spheres 23 in the chains. The ridges 39 between the grooves 38 have cuts 40 made across them at intervals—for example, at intervals of 120°, and the front end of each resulting ridge section, with respect to the direction of rotation of the roller 20 (thus the ends 41 in Figs. 7 and 9), is deformed so as to extend slightly into the adjacent groove, and, by engaging a sphere of the chain in the groove, prevents the possibility of the chains 18 slipping in the grooves 38 and thus failing to be moved in unison with the rotation of the roller 20. The direction of rotation of the roller 20 is indicated by the arrows in Figs. 7 and 9 and is clockwise as viewed in Fig. 1.

As will be observed from Figs. 1 and 2, the oil-carrying moving chains 18 will engage the substantially cylindrical surface of the piece of dough 16 and the flexibility of the chains enables them to conform to any irregularities in the contour of the dough piece. Depending upon the length of the dough piece, generally a chain will also contact each end face of the dough piece, such as the chains 18a and 18b in Fig. 2.

If the dough pieces are of insufficient length to be contacted by all the chains, the chains which have no contact with the dough, such as the chains 18c and 18d in Fig. 2, if allowed to continue moving in unison with the other chains, might drip oil down on the traveling belt 17 with the result that an accumulation of oil on the belt 17 would eventually occur which could spread too much oil on the dough or which at least would waste oil. To avoid such possibility I provide adjustable means at each end of the chain-moving roller 20 for keeping the end chains from being driven by the roller 20. Such chain control means will be described with reference to Figs. 7, 9, 10 and 11.

A chain resting support 42, in the form of an incomplete cylinder with the diameter of the inside surface greater than the external diameter of the roller 20, is supported on a bracket 43 which is slidable on a horizontal bar 44 and is secured in desired position by a clamping screw 45. A similar chain resting support (not shown) is similarly mounted at the other end of the roller 20. When no chains are to be kept from moving, the chain resting support is placed in the inactive position illustrated in Fig. 7. Now let it be assumed that two end chains have no contact with the dough pieces and therefore should be kept from moving. In such case the two chains are manually lifted from their grooves on the roller 20 and are slipped over the chain resting support 42 which is slid on its supporting bar 44 until it extends over the grooves of the chains in question. The chain resting support will then be in the position illustrated in Figs. 9 and 11, and thus, by holding these two chains out of contact with the roller 20, will keep them at rest while the remaining chains are being moved. The inner end of the resting support 42 has a peripheral flange 46 to prevent the chains at rest from inadvertently slipping off that end of the chain resting support. In this way any chains at either end of the roller 20, which are not having actual contact with the dough pieces, can be held at rest so as not to move with the others and thus prevent any undesired distribution of the oil.

In order to permit some adjustment in the effective length of all the moving chains the idling roller 19 (Figs. 1 and 4), over which all the chains pass, and the adjacent notched guide 22, are mounted at each end in a plate 47 (shown more clearly in Fig. 4A) which plate 47 is held by a pair of bolts 48 which extend through a horizontal slot 49 in the side wall 10 of the housing. Thus by shifting the mounting plates 47 the extent to which the chains 18 drop down below the oil pan 12 can be modified.

In Figs. 1, 2 and 5 I have indicated means by which the pan 12 can be kept filled with oil from a tank or reservoir positioned above the pan 12. However, if relatively light oils are to be used for greasing the dough it may be preferred to use a pumping system for maintaining the oil supply in the pan 12. Such a system is shown for example, in Fig. 12. A supply tank 50 is located at any convenient place below the pan 12. A pipe 51 leads from the tank 50 to a pump 52 and a pipe 53 leads from the pump 52 through a needle valve 54 and control to a discharge outlet over the pan 12. A relief valve 55 is connected between the pipes 51 and 53 to prevent excessive pressure being built up in the pipe 53 if the volume of oil passing through the pump is too excessive by comparision with the amount delivered into the pan 12. A level pipe 56 in the pan has its bottom end extending below the pan and having a telescoping fit with a drain pipe 57 leading back to the tank 50.

Various means may be used for driving the roller 20. I have illustrated one such means in the drawings, which I have found to be very satisfactory in the carrying out of my invention. A trip plate 27 (Figs. 1 and 4) is secured to a shaft 28, the latter being supported at each end in journal bearings in the housing side walls. As each piece of dough contacts the trip plate 27, as the dough is moved along by the traveling belt 17, the trip plate is momentarily lifted by the dough and then drops down again as the dough piece passes out of contact with the trip plate. A lug 29 (Fig. 3) on one end of the shaft 28 engages a control member for an air valve 30. Air under compression from a suitable source (not shown) is permitted to pass through the air valve 30 into an air cylinder 31 (Figs. 3 and 4) whenever the control member is pushed to the right (as viewed in Fig. 3) by the lug 29, and consequently whenever the trip plate 27 is lifted. The momentary passage of air under pressure into cylinder 31 actuates a piston 32 which is connected with the end of an arm 33. The top end of the arm 33 is pivotally supported on the shaft 37 of the roller 20. A pawl 34 mounted on the arm 33 engages a ratchet wheel 35 which is secured to the shaft 37 of the roller 20 so that rotation of the ratchet wheel produces rotation of the roller 20. A spring 36 holds the pawl 34 in engagement with the ratchet wheel 35. An adjustable screw control, the outer end of which is indicated at 58 in Fig. 3, controls the stroke of the piston in the air cylinder 31 and thus the extent of the swing of the arm 33 and movement of the pawl 34. By adjusting this screw control, for example, the ratchet wheel 35 can be made to advance an amount of one tooth or a plurality of teeth with each piston stroke.

Thus each time a piece of dough lifts the trip plate 27 the roller 20 is given a partial rotation. Increasing the number of dough pieces and thus spacing the dough pieces in closer succession on the traveling belt 17 will also automatically cause the intermittent partial rotations of the roller 20 and the movement of the chains 18 to be speeded up somewhat. Since this same lifting of the trip plate 27 has been utilized by me to control the operation of other devices which I have described in another copending application, I have found this means for driving the roller 20 and moving the chains 18 most convenient, but obviously other means could also be used to accomplish the same purpose.

Several modifications could be made in the apparatus which I have illustrated and described for the carrying out of my invention. Other modified forms of chains might also be employed. However, I believe the chains composed of substantially spherical members loosely connected by short links, such as the chains illustrated and described, will work most satisfactorily in my invention since such chains pass smoothly over the dough pieces and perform their function of depositing and spreading the oil on the dough very efficiently.

As mentioned earlier, oil is preferably used for greasing the dough. However, grease, in heated liquid state, may be satisfactorily employed with my invention, and it is to be understood that whenever the term "oil" is used here in the specification or claims, the term is to be understood to include broadly any dough-greasing substance in liquid or semi-liquid form.

I claim:

1. In a dough greasing device for applying oil to the surfaces of dough pieces, embodying a conveyor for supporting pieces of dough, a housing disposed above said conveyor, a pair of rollers rotatably mounted in said housing superjacent said conveyor and extending transversely over the path of travel of said conveyor, a pan for containing oil supported in said housing intermediate said rollers, a plurality of discrete endless flexible chains entrained over said rollers, said chains extending in the direction of travel of said conveyor and being spaced laterally and parallel one with respect to another, said chains being of such length that the lower runs thereof have sufficient slack when the upper runs are taut for engaging and assuming the contour of pieces of dough on said conveyor, a guide member having a plurality of spaced notches formed therein disposed adjacent one of said rollers, said guide member engaging said endless chains for guiding the chains of said roller in spaced parallel relation, a plurality of grooves provided in the other of said rollers for receiving said chains, projections on said last mentioned roller engageable with said chains for moving the chains upon the rotation of said roller, a trip plate associated with said conveyor, driving means connected to said last mentioned roller, means on said trip plate for actuating said driving means to rotate said last mentioned roller contemporaneous with the actuation of said trip plate by a piece of dough on said conveyor.

2. In a dough greasing device for applying oil to the surfaces of pieces of dough embodying a conveyor for supporting dough pieces, a housing disposed above said conveyor, a pair of rollers rotatably mounted in said housing above said conveyor and extending transversely over the path of travel of said conveyor, a pan for oil supported in said housing intermediate said rollers in aligned relation therewith, a plurality of discrete endless flexible chains supported on said rollers, said chains extending in the direction of travel of said conveyor and being spaced laterally and parallel one with respect to another, said chains being of such length that the lower runs thereof have sufficient slack when the upper runs are taut for engaging and assuming the contour of pieces of dough on said conveyor, guide means adjacent one of said rollers for retaining said chains in spaced parallel relation, the other of said rollers constituting the drive roller for said endless chains and having a plurality of spaced grooves formed therein for the reception of said chains, means on said drive roller arranged to extend into the grooves formed therein for engaging said chains and moving the chains upon the rotation of said driving roller in a direction opposite to the direction of movement of said conveyor, a bar mounted in said housing in spaced parallel relation with said driving roller, brackets slidably mounted on said bar, chain rest supports of cylindrical configuration carried by said brackets and adapted to partially incase said driving roller for retaining a portion of said endless chains out of engagement with said driving roller, a flange provided on said chain supports for insuring the retention of said chains on said supports, and driving means connected to said driving roller for moving said chains.

3. In a dough greasing device for applying oil to the surfaces of pieces of dough embodying a conveyor for supporting pieces of dough, a plurality of rollers arranged in spaced aligned relation and extending transversely of said conveyor and superjacent thereof, a pan for containing oil interposed between and in aligned relation with said rollers, a plurality of endless chains independently entrained in parallelism over substantially the entire length of said rollers and arranged in spaced relation to and in alignment with said conveyor, each of said chains being of such length that the lower runs thereof have sufficient slack when the upper runs are taut for engaging and assuming the contour of pieces of dough on said conveyor and driving means connected to one of said rollers for moving each of said chains through said pan.

4. In a dough greasing device for applying oil to the surfaces of pieces of dough embodying a conveyor for supporting pieces of dough, a plurality of rollers arranged in spaced aligned relation and extending transversely of said conveyor and superjacent thereof, a pan for containing oil interposed between and in aligned relation with said rollers, a plurality of endless chains independently entrained in parallelism over substantially the entire length of said rollers and arranged in spaced relation to and in alignment with said conveyor, each of said chains being of such length that the lower runs thereof have sufficient slack when the upper runs are taut for engaging and assuming the contour of pieces of dough on said conveyor, driving means connected to one of said rollers for moving each of said chains through said pan, guide means cooperating with the other of said rollers for engaging and retaining said chains in parallelism and a roller mounted in said pan and beneath which said chains pass.

5. In a dough greasing device for applying oil to the surfaces of dough pieces embodying a conveyor for supporting pieces of dough, a plurality of rollers arranged in spaced aligned relation and extending transversely of said conveyor and superjacent thereof, a pan for containing oil interposed between and in aligned relation with said rollers, a tank for containing a supply of oil, a conduit connecting said tank with said pans, a float actuated valve in said pan for controlling the level of oil in said pan, a plurality of endless chains independently entrained in parallelism over substantially the entire length of said rollers and arranged in spaced relation to and in alignment with said conveyor, each of said chains including a plurality of spheres joined one to another by link bars, each of said chains being of such length that the lower runs thereof have sufficient slack when the upper runs are taut for engaging and assuming the contour of pieces of dough on said conveyor, guide means cooperating with one of said rollers for retaining said chains in parallelism, driving means connected to the other of said rollers, means on said last mentioned roller engageable with said spheres for moving said chains in a direction opposite to the direction of movement of said conveyor and a roller mounted in said pan and beneath which said chains pass.

6. In a dough greasing device for applying oil to the surfaces of dough pieces embodying a conveyor for supporting pieces of dough, a plurality of rollers arranged in spaced aligned relation and extending transversely of said conveyor and superjacent thereof, a pan for containing oil interposed between and in aligned relation with said rollers, a plurality of endless chains independently entrained in parallelism over substantially the entire length of said rollers and arranged in spaced relation to and in alignment with said conveyor, each of said chains being of such length that the lower runs thereof have sufficient slack when the upper runs are taut for engaging and assuming the contour of pieces of dough on said conveyor, guide means cooperating with one of said rollers for engaging and retaining said chains in parallelism, driving means connected to the other of said rollers, said last mentioned roller having a plurality of grooves formed therein for receiving said chains, the portions of said last mentioned roller defining said grooves having spaced projections formed thereon arranged to extend into said grooves for engaging said chains to move said chains through said pan in the same direction as the direction of movement of said conveyor.

7. In a dough greasing device for applying oil to the surfaces of dough pieces embodying a conveyor for supporting pieces of dough, a plurality of rollers arranged in spaced aligned relation and extending transversely of said conveyor and superjacent thereof, a pan for containing oil interposed between and in aligned relation with said rollers, a plurality of endless chains independently entrained in parallelism over substantially the entire length of said rollers and arranged in spaced relation to and in alignment with said conveyor, each of said endless chains including a plurality of spheres connected one to another in spaced relation by link bars, each of said chains being of such length that the lower runs thereof have sufficient slack when the upper runs are taut for engaging and assuming the contour of pieces of dough on said conveyor, guide means cooperating with one of said rollers for retaining said chains in parallelism, driving means connected to the other of said rollers, said last mentioned roller having a plurality of spaced grooves formed therein for receiving said chains, the portions of said last mentioned roller defining said grooves having spaced projections formed thereon and arranged to extend into said grooves for engaging the spheres of said chains to move the upper run of said chains through said pan while moving the lower run in a direction opposite to the direction of movement of said conveyor and support means adjacent said last mentioned roller for engaging and retaining certain of said chains out of said grooves.

8. In a dough greasing device for applying oil to the surfaces of dough pieces embodying a conveyor for supporting pieces of dough, a plurality of rollers arranged in spaced aligned relation and extending transversely of said conveyor and superjacent thereof, a pan for containing oil interposed between and in aligned relation with said rollers, a plurality of endless chains independently entrained in parallelism over substantially the entire length of said rollers and arranged in spaced relation to and in alignment with said conveyor, each of said endless chains including a plurality of spheres connected one to another in spaced relation by link bars, each of said chains being of such length that the lower runs thereof have sufficient slack when the upper runs are taut for engaging and assuming the contour of pieces of dough on said conveyor, guide means cooperating with one of said rollers for retaining said chains in parallelism, driving means connected to the other of said rollers, said last mentioned roller having a plurality of spaced grooves formed therein for receiving said chains, the portions of said last mentioned roller defining said grooves having spaced projections formed thereon and arranged to extend into said grooves for engaging the spheres of said chains to move the upper run of said chains through said pan while moving the lower run in a direction opposite to the direction of movement of said conveyor and means for adjusting the position of the first mentioned roller with respect to the second mentioned roller for varying the effective length of said chains.

9. In a dough greasing device for applying oil to the surfaces of dough pieces embodying a conveyor for supporting pieces of dough, a plurality of rollers arranged in spaced aligned relation and extending transversely of said conveyor and superjacent thereof, a pan for containing oil interposed between and in aligned relation with said rollers, a plurality of endless chains independently entrained in parallelism over substantially the entire length of said rollers and arranged in spaced relation to and in alignment with said conveyor, each of said chains formed of small rounded bodies flexibly joined together in spaced aligned relation by link bars, each of said chains being of such length that the lower runs thereof have sufficient slack when the upper runs are taut for engaging and assuming the contour of pieces of dough on said conveyor, driving means connected to one of said rollers for moving said chains through said pan and guide means adjacent the other of said rollers for retaining said chains in parallelism.

HERBERT C. RHODES.

References Cited in the file of this patent

UNITED STATES PATENTS

| Number | Name | Date |
|---|---|---|
| 921,229 | Gleason | May 11, 1909 |
| 1,153,585 | Vicars et al. | Sept. 14, 1915 |
| 1,305,127 | Lawson | May 27, 1919 |
| 2,535,573 | Hettinger | Dec. 29, 1950 |